Dec. 29, 1931.    A. R. THOKE ET AL    1,838,719
STEAM TRAP
Filed Nov. 17, 1928
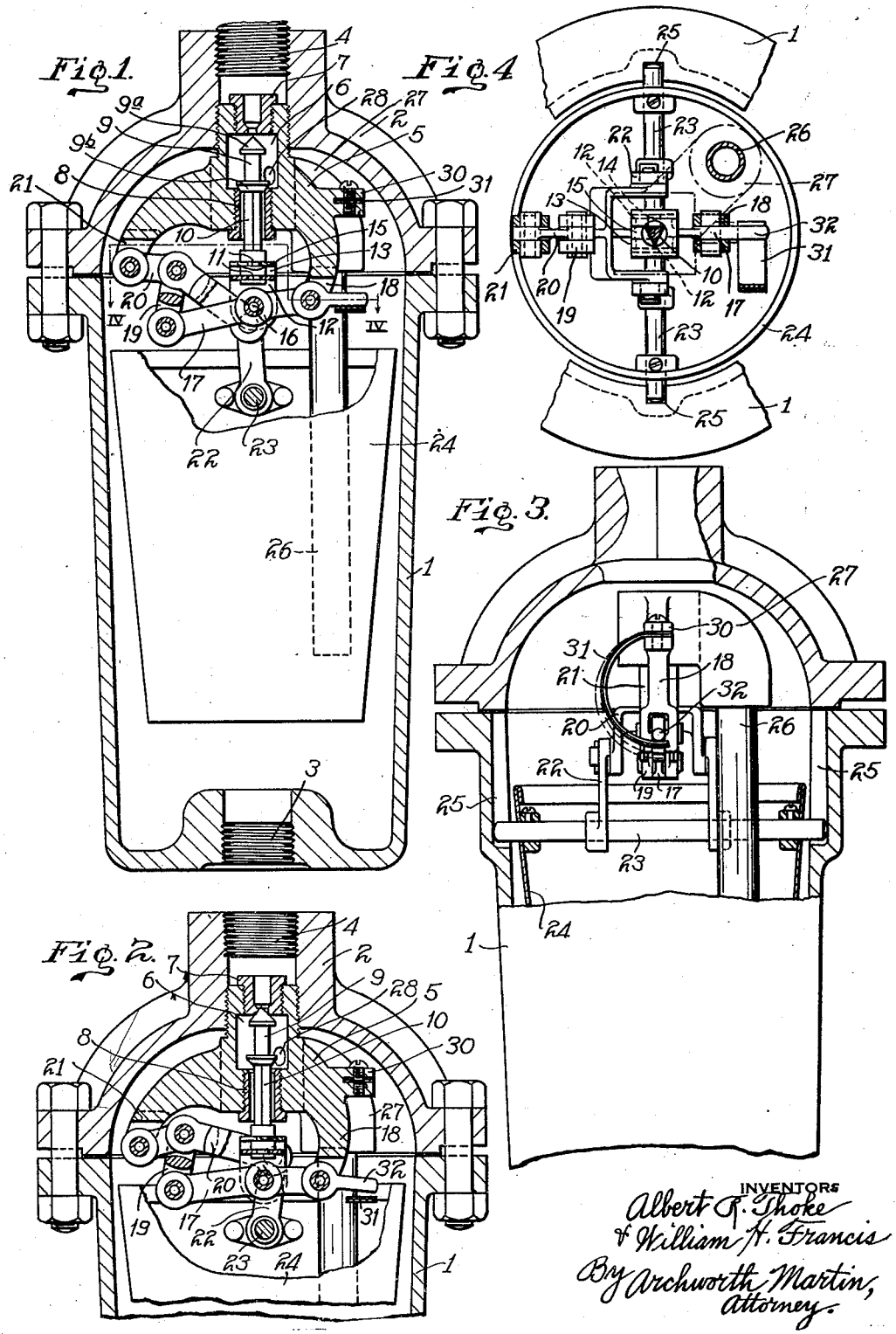
INVENTORS
Albert R. Thoke
& William H. Francis
By Archworth Martin,
Attorney.

Patented Dec. 29, 1931

1,838,719

UNITED STATES PATENT OFFICE

ALBERT R. THOKE AND WILLIAM H. FRANCIS, OF PITTSBURGH, PENNSYLVANIA

STEAM TRAP

Application filed November 17, 1928. Serial No. 320,083.

Our invention relates to steam traps, and more particularly to certain improvements therein for automatically removing water of condensation from steam distributing systems without waste of steam or in any way retarding its free flow through such system.

An object of our invention is to provide means for maintaining a float in alignment with a valve mechanism so that a more positive operation of the valve will result without binding.

Another object of our invention is to provide a float for operating a valve mechanism which will be free from bobbing and swaying, caused by surging of the steam and water entering the trap.

Another object of our invention is to make provision for a more positively and efficiently operating valve mechanism for controlling the discharge of the trap, whereby a "flash" of the trap will be eliminated.

Still another object is to provide a novel means for connecting a valve stem with valve-operating mechanism.

A still further object of our invention is to simplify and improve generally the structure and operation of steam traps.

In the accompanying drawings, Figure 1 is a central vertical section through the trap, showing it in the discharge position; Fig. 2 is a sectional view of the upper portion of the trap containing the valve mechanism and illustrated in its closed position; Fig. 3 is a fragmentary side view, partly in section, of the trap, and Fig. 4 is a cross section taken on the line IV—IV of Fig. 1.

Referring to the drawings, the trap comprises a casing 1 which is normally closed by a cap or cover 2, which is securely bolted to the casing 1, and provided with packing to make a steam and liquid tight joint.

The bottom of the casing 1 is provided with an inlet 3, and the cap 2 is provided with an outlet 4. The water of condensation enters the trap through the inlet 3 and is discharged through the outlet 4.

A valve body or casing 5 is threaded into the lower end of the outlet 4, and is provided with a valve chamber 6. A valve seat 7 is threaded into the upper part of the casing 5, a central aperture in the valve seat providing a passageway from the chamber 7 to the outlet 4 for the discharge of water.

A guide sleeve 8 is threaded into the lower part of the casing 5, in alignment with the valve seat 7. A double valve 9 having a valve stem 10 is positioned centrally in the valve chamber 6 with the stem 10 projecting downwardly through an opening in the guide sleeve 8. The stem 10, for a distance greater than the length of the guide sleeve 8, is triangular in cross section, in order that it may freely slide in the guide sleeve.

This construction involves ribs or radial projections from the valve stem, which make a line contact, instead of the usual surface contact, between the stem 10 and the guide 8, thereby reducing friction therebetween, and reducing the possibility of the valve sticking.

The lower end of the stem 10 is provided with spaced-apart reduced portions 11 for receiving U-shaped links 12 and 13 (Figs. 1 and 4). The link 12 is provided with a slot 14, extending from one leg of the link inwardly and adapted to accommodate the lower reduced portion 11 of the stem 10, while the link 13 is provided with a slot 15 disposed in right angle relation to the slot 14, extending from one edge of the link inwardly, to accommodate the upper reduced portion 11 of the stem 10. The link 12 is positioned on the stem 10, then the link 13 is super-imposed thereon, with holes in each leg of the links coinciding. By means of a pin 16 extending through the legs of the links, the valve stem is thus securely connected to the lever 17.

One end of the lever 17 is pivoted to an arm 18, projecting downwardly from the casing 5, the other end being connected to a link 19 that is connected to a lever 20. The lever 20 is pivoted to an arm 21, projecting downwardly from the casing 5, the other end of the lever 20 being connected to links 22 which project downwardly and are pivotally connected to a rod 23.

The rod 23 supports a float or bucket 24 which is open at its top. The float is adapted to operate the valve through the lever mechanism, to permit discharge of the trap.

The arm 18 is provided with a bifurcated lug 30 to which one end of an arcuate bi-metallic member 31 is suitably secured. The free end of the member 31 is positioned to engage the lower edge of a pin 32 projecting outward from the pivoted end of the lever 17.

When the temperature of the trap is substantially low, the bi-metallic member 31 contracts to engage the pin 32 to maintain the valve 9 open against the flotation of the bucket 24.

Any air in the trap and steam system will be discharged through the valve opening to put the trap in proper condition to operate automatically. When steam enters the trap, the temperature of the trap rises and the lower end of the member 31 moves downwardly to release the pin 32, thereby permitting the float 24 to operate, through the lever mechanism, to close the valve 9. The member 31 is maintained in its expanded position, as shown in the broken lines of Fig. 3, by the high temperature of the trap due to the presence of steam and water of condensation.

Normally, the valve 9, controlling the discharge passage, is maintained in its closed position by the flotation of the bucket 24. As the trap 1 is being filled with water of condensation, the level rises to the open top of the bucket, to fill the bucket and cause it to sink. The surging and churning water tends to cause the float to bob and swing about in the float chamber 1. Such uncontrolled movements of the float result in excessive wear upon the associated mechanism, and may, in time, cause serious damage to the working parts of the trap, and prevent the proper operation thereof.

In order to overcome this difficulty, I extend the ends of the rod 23 through the sides of the bucket into vertical slots 25, for slidable engagement therewith. The slots 25 extend from the top edge of the casing 1 downwardly, a distance sufficient to permit movement of the float to its lowest position.

By this construction, we restrict surging movements of the float and permit only the necessary vertical movement, and the float is maintained in alignment with the valve mechanism thus assuring positive operation thereof.

A pipe 26 extends nearly to the bottom of the bucket 24 and has its upper end screwed into a boss 27 that projects downwardly from the casing 5. The boss 27 is provided with a passageway 28 opening into the valve chamber 6. Water is conducted through the pipe 26, and the passageway 28 into the chamber 6, during discharge of the trap.

As previously described, the valve chamber 6 is provided with a double valve 9 comprising an upper valve disc 9a and a lower valve disc 9b. The valve disc 9a engages the valve seat 7 and controls the discharge of the trap, and the valve disc 9b engages a valve seat provided in the upper end of the guide sleeve 8, to prevent steam from escaping through the opening in the guide sleeve.

The inlet 3 of the trap being connected by suitable pipe connections to a steam line (not shown), the operation of our trap is as follows: The water of condensation and air enter the casing 1 through the inlet 3. The air will escape through the discharge passage 4 as before described. The inflow causes the water to rise in the casing until the buoyancy of the water, acting upon the outer surface of the bucket, causes the bucket to rise until the valve 9a is seated upon the valve seat 7 to close the discharge outlet (Fig. 2). The bucket is maintained in a stationary position while the water rises in the casing 1 to a level where it will pour over the upper edge and into the bucket 24. When sufficient water collects in the bucket, to overcome the flotation, the bucket will sink in the water contained in the casing 1. The bucket is accelerated in its downward movement by the sudden influx of water, thereby imparting a positive movement to the valve-operating mechanism to open the valve 9a. The downward movement of the bucket is arrested by the closure of the valve 9b, thereby preventing escape of steam through the guide sleeve 8 (Fig. 1).

The steam pressure in the casing 1 will force the water from the bucket 24 through the pipe 26, and through the passageway 28 into the valve chamber 6. From the chamber 6, the water passes through the valve opening and discharges through the outlet 4, which may be suitably piped to a receptacle for receiving the discharged water.

When sufficient water has been expelled from the bucket 24, it will again float, and the upward movement causes the valve 9a to close, thereby restoring the trap to a condition for a repetition of the operation just described.

It will be noted that all the water will not be discharged from the valve chamber 6 with each discharge operation, before the flotation of the bucket causes the closure of the discharge valve. For a slight interval of time before the discharge valve 9a closes, each valve 9a and 9b will be unseated. During this time however, the superincumbent pressure in the casing 1 will force some of the water in the valve chamber 6 through the discharge opening before the valve 9a closes. The remaining water will flow through the opening in the guide sleeve 8 and drop into the bucket 24. Due to this action, the so-called "flash" or escape of steam from the trap is eliminated. Also, the guide sleeve and valve stem are washed of any foreign material that may be lodged in the guide sleeve, and that might cause sticking or improper operation of the valve.

The construction and operation of our trap is comparatively simple and economical, providing for a more continuous operation with less wear on the operating parts. Certain changes and modifications may be made in our trap without departing from the scope of the appended claims.

We claim as our invention:—

1. The combination with a steam trap casing having an outlet passage at its upper end and a float contained therein, of a valve body connected to said outlet and having a valve seat, a valve controlling flow past said seat and through the said outlet, a guideway through one wall of said valve body, a valve stem for said valve extending through said guideway, a connection between the inner end of said valve stem and the float, whereby the valve is moved to and from its seat during vertical movements of the float, means for preventing flow through the space between the valve stem and said guideway when the said valve is in its open position, and a thermostatic element operative to engage said connection to maintain said valve in its open position when the trap is cold.

2. The combination with a steam trap casing having an outlet passage and a valve for controlling the discharge through said passage, of a float-actuated valve-operating mechanism having a lever, a valve stem for said valve, and a connection between the inner end of said valve stem and said valve-operating mechanism, comprising superimposed U-shaped links positioned between shouldered end portions of said valve stem, and a pin extending through the legs of said links and said lever.

3. The combination with a steam trap casing having an outlet passage and a valve for controlling the discharge through said passage, of a valve-operating mechanism having a lever, a valve stem for said valve, and a connection between the inner end of said valve stem and said valve-operating mechanism, comprising a U-shaped slotted member positioned in a reduced end portion of said valve stem and a U-shaped member having a slot in its body portion disposed at right angles to the slot in the first-named to accommodate an adjacent reduced end portion of said stem member, and superimposed on the first-named member, and a pin extending through the legs of said members and said lever.

4. A steam trap comprising a casing having diametrically opposed vertically elongated slots in the side walls thereof, a rod in said casing having its ends extending into said slots, a vertically movable float suspended from said rod, an outlet valve, and lever mechanism operatively connecting said valve to said float.

5. A steam trap comprising a casing having an outlet passage at its upper end, a valve for controlling the discharge through said passage, a rod in said casing having its ends extending into vertically-elongated guide slots at diametrically opposite sides of said casing, a vertically-movable bucket-float secured to said rod and depending downwardly therefrom, and lever mechanism operatively connecting said valve to said float.

6. A steam trap comprising a casing having an outlet passage at its upper end, a valve for controlling the discharge through said passage, a rod in said casing having its ends extending into vertically-elongated guide slots at diametrically opposite sides of said casing, a vertically-movable bucket-float secured to said rod and depending downwardly therefrom, and lever mechanism operatively connecting said valve to said float, the said rod extending through the sides of said bucket-float for supporting the same in a depending position.

In testimony whereof we, the said ALBERT R. THOKE and WILLIAM H. FRANCIS have hereunto set our hands.

ALBERT R. THOKE.
WILLIAM H. FRANCIS.